United States Patent [19]
deCarmo

[11] Patent Number: 6,138,175
[45] Date of Patent: Oct. 24, 2000

[54] SYSTEM FOR DYNAMICALLY OPTIMIZING DVD NAVIGATIONAL COMMANDS BY COMBINING A FIRST AND A SECOND NAVIGATIONAL COMMANDS RETRIEVED FROM A MEDIUM FOR PLAYBACK

[75] Inventor: Linden A. deCarmo, Plantation, Fla.

[73] Assignee: Oak Technology, Inc., Sunnyvale, Calif.

[21] Appl. No.: 09/082,017

[22] Filed: May 20, 1998

[51] Int. Cl.$^7$ ...................................................... G06F 13/14
[52] U.S. Cl. ........................................ 710/5; 710/6; 710/7
[58] Field of Search ................................. 710/5, 6, 68, 7; 711/125; 712/205

[56] References Cited

U.S. PATENT DOCUMENTS

| | | | |
|---|---|---|---|
| 5,008,808 | 4/1991 | Fries et al. | |
| 5,367,674 | 11/1994 | Berk et al. | 708/203 |
| 5,418,971 | 5/1995 | Carlson | 710/24 |
| 5,929,857 | 7/1999 | Dinallo et al. | 345/354 |

FOREIGN PATENT DOCUMENTS

8-334833   12/1996   Japan .

*Primary Examiner*—Thomas C. Lee
*Assistant Examiner*—Ilwoo Park
*Attorney, Agent, or Firm*—Kudirka & Jobse, LLP

[57] ABSTRACT

A DVD playback system having a navigation engine utilizes an optimizer which optimizes navigational commands to reduce the amount of memory required to store commands read from a DVD medium. The optimizer determines if a command is the type which may be combined with a subsequent command, and, if the following may be combined with the first. If so, the optimizer combines the two commands. Additionally, the optimizer re-orders command sequences before they are interpreted in order to permit their execution in parallel. After re-ordering the commands, the optimizer routes commands to either a primary or secondary execution unit for parallel execution. Commands are examined in the re-ordered sequence, with the first command encountered being routed to the primary execution unit and subsequent commands being routed to the primary or secondary execution unit depending upon whether they may be executed in parallel with commands in the primary execution unit without conflicting operations on the commands' operands.

20 Claims, 7 Drawing Sheets

SYSTEM FOR DYNAMICALLY OPTIMIZING DVD NAVIGATIONAL COMMANDS BY COMBINING A FIRST AND A SECOND NAVIGATIONAL COMMANDS RETRIEVED FROM A MEDIUM FOR PLAYBACK

FIELD OF THE INVENTION

This invention relates generally to improvements in digital versatile disc systems and, more particularly, to an improved navigation system for digital versatile disc systems.

BACKGROUND OF THE INVENTION

Digital versatile discs (DVDs) are information storage devices used for storing prerecorded audio information, movies and computer software. The storage mechanism used in DVDs closely resembles that used in compact discs (CDs). DVD players also use the same laser technology as CD players. Briefly, both DVDs and CDs store information as a pattern of pits formed in a metallic substrate. The pit patterns form digital words and can be read by shining a laser beam on the disc surface and detecting the reflected beam. The information storage capacity of a typical DVD, however, is much higher than a CD. Presently available DVDs have a variety of capacities which depend on the technology used to manufacture the discs. Single-layer technologies can be either single or double-sided with capacities of 4.7 gigabytes and 9.4 gigabytes, respectively. Dual layer technologies are available which use single or double sided capacities that hold approximately 8.5 gigabytes per side. This high information storage capacity makes DVDs suitable for storing not only audio information, but also video information and large amounts of computer data as well.

DVD players have many CD player features, such as the ability to play selections in any order desired and the ability to read information from any point on the disc. However, DVDs can store information in several formats. For example, DVDs which are used to store video information, hereinafter called DVD-VIDEO discs, may use various known information compression algorithms, such as MPEG-2 for video compression/decompression. A DVD may also include high fidelity sound as well. In addition, a DVD may also store uncompressed linear pulse code modulated data streams which have sample rates between 48–96 kHz and are sampled at 16 or 24 bits. Still other DVD versions, hereinafter called DVD-ROM discs, can store digital data for computer use, and the data may also be compressed on these discs.

Although DVD-ROM and DVD-VIDEO discs share compression algorithms, the data format on DVD-VIDEO discs is significantly different than the data format found on DVD-ROM discs. One important difference is that the data content on DVD-ROM is platform-specific, while DVD-VIDEO discs operate with a platform independent navigation engine for playing interactive movies. This navigation engine requires that the files on the DVD-VIDEO disc be referenced in a predetermined directory structure.

In particular, each DVD-VIDEO disc contains a main directory denoted as a VIDEO_TS directory which contains two types of files distinguished with the file extensions .IFO and .VOB. During playback, these files are sorted by a DVD video player to form video "title" sets, which are groupings of all files necessary to play a particular DVD video "title", for example, a movie. Each video title set is composed of one .IFO file and one or more .VOB files.

A file with the .VOB extension contains the actual multimedia data and is called a video object set. The location and format of the multimedia data stored in the video object set is defined by the associated .IFO file. In particular, .IFO files contain navigational data structures and a processor-independent interpreted language which specifies how the data structures are arranged.

The data structures themselves are composed of various objects called "program chain objects", "program objects", and "cell objects". Program chain objects link related program objects e.g., particular scenes, within a title and their data structures govern the playback of the program objects. For example, a simple title may contain only one program chain. However, complex titles may contain two or more program chains to allow random access to a variety of programs. The multiple program chain title can play programs linearly, randomly or in a "shuffle" mode.

Each program object in a program chain is composed of elements called "cell objects". These objects instruct a DVD player which portion of the multimedia data in one of the .VOB files to decode. In particular, the data structures in a cell object are defined in the .IFO file and the multimedia content is found in one of the .VOB files. Each cell object directs the DVD player to begin playback at a specific location in the .VOB file which is referred to as a video object unit or "VOBU". A VOBU is a container object that includes both navigational data as well as multimedia data.

Navigational input can also be obtained directly from a user by means of navigational buttons which are displayed under playback program control onscreen along with the multimedia data. The playback program controls both the time duration that the button appears on the screen and the manner that the system responds to the selection of a button by a user. For example, user selection of a button may cause the playback program to jump to a new location on the disc and begin playback at the new location.

The specific navigational commands which are recognized by a DVD player are controlled by a device independent language and a set of DVD player parameters which define the current state of the DVD player. These navigational commands can be broken into several categories including the following: Set, SetSystem, GoTo, Link, Jump and Compare.

Set commands permit primitive operations, such as assignment operations, to manipulate the values of selected stored parameters and include: Mov, Swp, Add, Sub, Mul, Div, Mod, Rnd, And, Or, and Xor. SetSystem commands are used to set the internal system parameters of the player and include: SetSTN, SetNVTMR, Set GPRMMD, SetAMXMD, and Set_BTNN. GoTo commands are used to skip to a specific instruction number in the instruction stream and Link and Jump commands cause program execution to jump to various locations within a title or menu on the disc. Link instructions include: LinkPGCN, LinkPTTN, LinkPGN, LinkCn, and LinkSlns. Compare commands allow value testing on either a system or user parameter. The DVD command set, including the aforementioned commands and their definitions, are published in the DVD specification. A copy of the *DVD 1.0 Specification for Read-Only Disc* Vol. 3, including a more detailed description of all DVD commands, may be obtained, for example, from Toshiba Corp., 1-1 Shibaura 1-Chome, Minato-ku, Tokyo 105-01 Japan.

The DVD navigation commands provide an efficient way to move to different locations on a DVD disc under program control. Typically, the commands required to play disc titles are downloaded from the DVD disc and processed before the player begins playback. That is, the playback system typically downloads navigational information from the disc and processes that information before it even begins to play a title. This permits the playback system to assemble navigational commands in a manner which is, for example, responsive to a parent's supervision, allowing the system to "skip" sections of a title that contain objectional material. In order to reduce DVD disc accesses, and thereby improve system response time, all the disc's navigational information is typically downloaded from the disc and stored in a relatively high speed memory, or cache.

Each DVD command typically occupies eight bytes of code. The DVD specification enables some commands to occupy only 4 bytes. DVD command streams are frequently "bloated" with unnecessary commands. Since the DVD command language is a platform-independent interpreted language, conventional compiled code optimizers cannot be used to optimize the DVD command stream.

Another way in which DVD playback is limited involves the processing of commands to form a navigation stream. After downloading the navigational commands, an execution unit processes the commands to produce a navigation stream for the DVD player. The speed with which commands are processed by the execution unit limits the speed at which playback may commence or shift from one title on the DVD disc to another.

A need exists for DVD playback system which optimizes navigational commands and which accelerates the execution of those commands would therefore be highly advantageous.

A further need exists for a method and system in which two commands may be compressed to significantly increase a system's operational speed by eliminating disk accesses. A further need exists for a system in which commands may be executed in parallel to accellerate command execution.

SUMMARY OF THE INVENTION

According to one aspect of the present invention, a DVD navigation system optimizes navigational commands to reduce the amount of memory required to cache the commands. In an illustrative embodiment, an optimizer examines a command to determine whether it is a command that may be combined with a subsequent command. If the command may be combined with a subsequent command, the optimizer examines the following command to determine whether it may be combined with the first and, if so, it combines the two commands, thereby reducing by half the memory required to store the two commands. The optimizer proceeds in this fashion, as navigation commands are read from the medium, e.g., DVD disc, until all commands that could be combined are combined.

Additionally, in the illustrative embodiment the optimizer re-orders command sequences before they are interpreted in order to permit their execution in parallel. After re-ordering the commands, the optimizer routes commands to either a primary or secondary execution unit for parallel execution. Each execution unit executes navigational commands and, in an object-oriented environment, each of the execution units according to the illustrative embodiment would be implemented as a separate object having its own state. Additionally, each execution unit could be implemented as a single thread in a multi-thread system, may have a dedicated processor in a multi-processor system, or may have dedicated silicon or microcode implementation. In short, each execution unit may be implemented in any of a variety of ways which accelerate the system's operation.

Commands are examined in the re-ordered sequence, with the first command encountered being routed to the primary execution unit. The next command encountered is routed to the secondary execution unit if it is the type of command that is amenable to parallel execution and it's operands are not affected by the command executing in the primary execution unit. If the second command is routed to the secondary execution unit the following command, the third command, is routed to the primary execution unit and the process proceeds from there as just described. If the second command is not routed to the secondary execution unit, the following, i.e., third, command is routed to the secondary execution unit if it is the type of command that is amenable to parallel execution and it's operands are not affected by the command executing in the primary execution unit.

BRIEF DESCRIPTION OF THE DRAWINGS

The above and other features, objects and advantages of the invention will be better understood by referring to the following detailed description in conjunction with the accompanying drawing in which.

DETAILED DESCRIPTION

Figure 1:
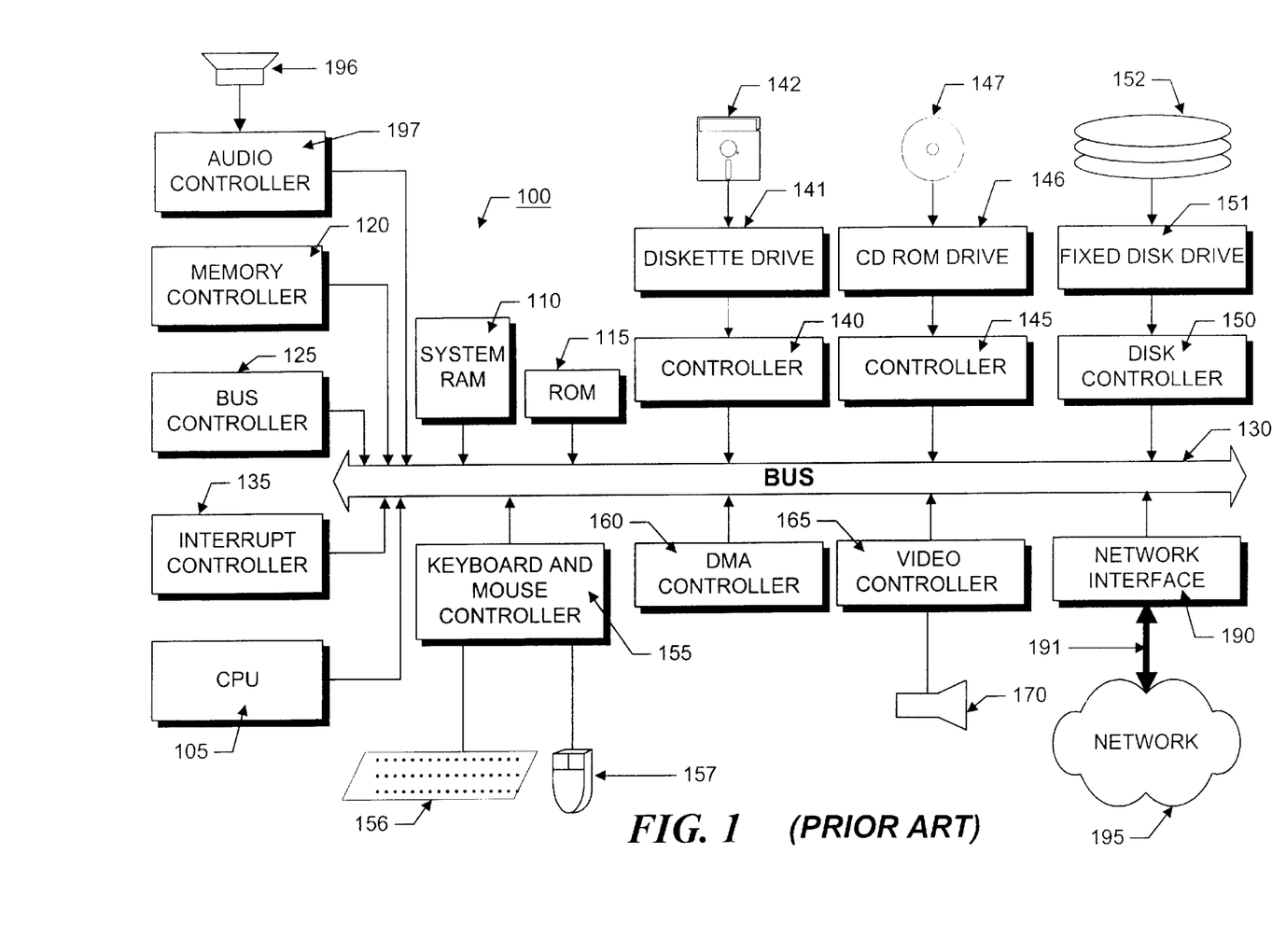
FIG. 1 is a block diagram of a computer system suitable for use with the present invention.

FIG. 1 illustrates the system architecture for a computer system 100 such as an IBM PS/2®, on which the invention may be implemented. The exemplary computer system of FIG. 1 is for descriptive purposes only. Although the description may refer to terms commonly used in describing particular computer systems, such as in IBM PS/2 computer, the description and concepts equally apply to other systems, including systems having architectures dissimilar to FIG. 1.

Computer system 100 includes a central processing unit (CPU) 105, which may be implemented with a conventional microprocessor, a random access memory (RAM) 110 for temporary storage of information, and a read only memory (ROM) 115 for permanent storage of information. A memory controller 120 is provided for controlling RAM 110.

A bus 130 interconnects the components of computer system 100. A bus controller 125 is provided for controlling bus 130. An interrupt controller 135 is used for receiving and processing various interrupt signals from the system components.

Mass storage may be provided by diskette 142, CD ROM 147, or hard drive 152. Data and software may be exchanged with computer system 100 via removable media such as diskette 142 and CD ROM 147. Diskette 142 is insertable into diskette drive 141 which is, in turn, connected to bus 130 by a controller 140. Similarly, CD ROM 147 is insertable into CD ROM drive 146 which is, in turn, connected to bus 130 by controller 145. Hard disc 152 is part of a fixed disc drive 151 which is connected to bus 130 by controller 150.

User input to computer system 100 may be provided by a number of devices. For example, a keyboard 156 and mouse 157 are connected to bus 130 by controller 155. An audio transducer 196, which may act as both a microphone and a speaker, is connected to bus 130 by audio controller 197, as illustrated. It will be obvious to those reasonably skilled in the art that other input devices, such as a pen and/or tabloid may be connected to bus 130 and an appropriate controller and software, as required. DMA controller 160 is provided for performing direct memory access to RAM 110. A visual display is generated by video controller 165 which controls video display 170. Computer system 100 also includes a communications adaptor 190 which allows the system to be interconnected to a local area network (LAN) or a wide area network (WAN), schematically illustrated by bus 191 and network 195.

Operation of computer system 100 is generally controlled and coordinated by operating system software, such as the OS/2® operating system, available from International Business Machines Corporation, Boca Raton, Fla. The operating system controls allocation of system resources and performs tasks such as processing scheduling, memory management, networking, and I/O services, among things. In particular, an operating system resident in system memory and running on CPU 105 coordinates the operation of the other elements of computer system 100. The present invention may be implemented with any number of commercially available operating systems including OS/2, UNIX and DOS, etc. One or more applications, such as Lotus NOTES™, commercially available from Lotus Development Corp., Cambridge, Mass. may also run on the CPU 105. If the operating system is a true multitasking operating system, such as OS/2, multiple applications may execute simultaneously.

Figure 2:
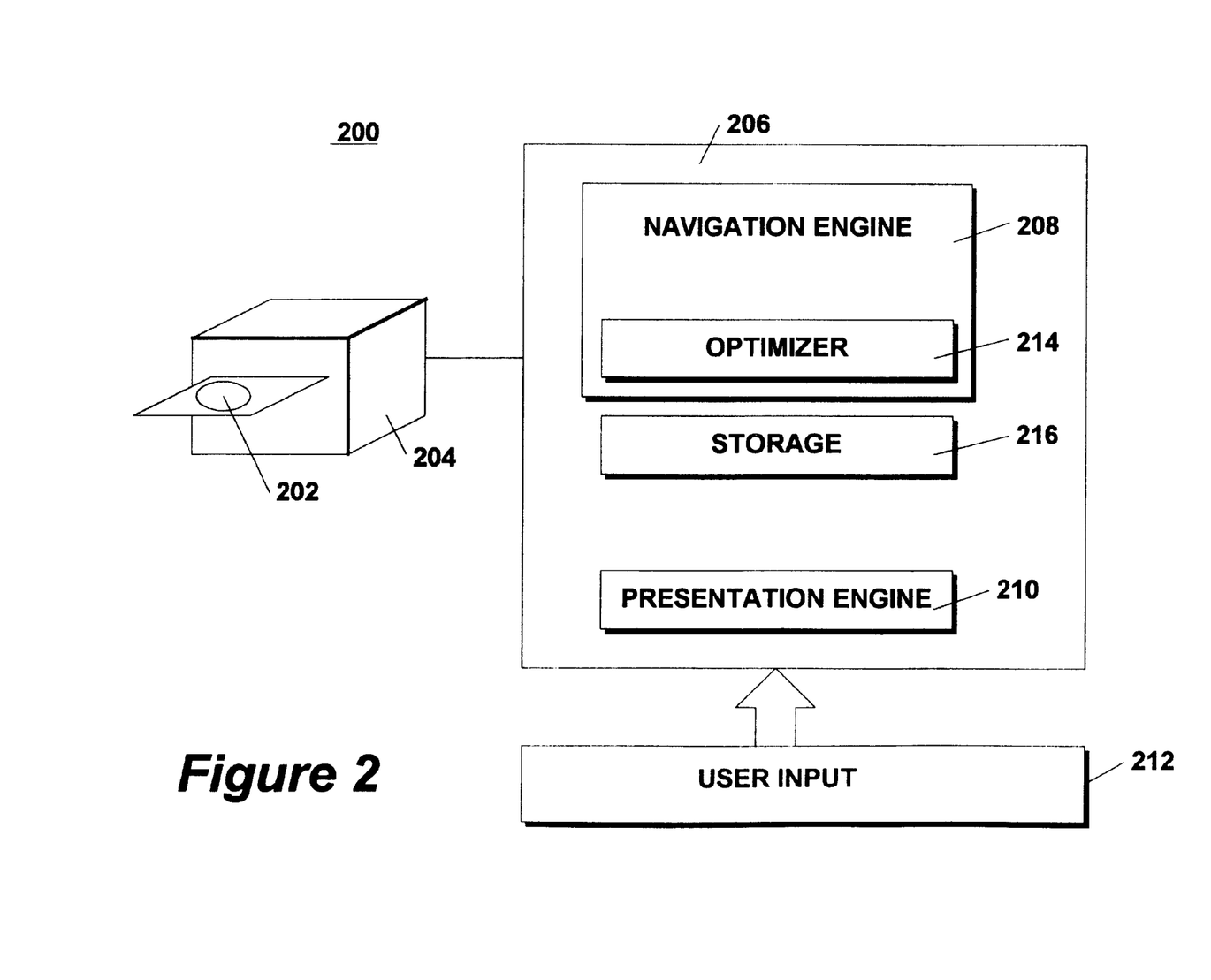
FIG. 2 is a conceptual diagram of the elements comprising a DVD system including a DVD drive and an accompanying computer with software components installed therein.

FIG. 2 illustrates conceptually the main components of a system 200 in accordance with the present invention. FIG. 2 shows a DVD-ROM drive 204 connected to a computer 206. Use of the DVD-ROM drive 204 with the computer 206 should not be construed as a limitation of the invention, however, since other DVD source mechanisms such as the internet, digital satellite dishes, etc., may be substituted for the DVD-ROM drive 204. In addition, the DVD-ROM drive 204 may also be a drive suitable for internal mounting in computer 206.

The DVD drive 204 receives a disc 202 containing compressed and encoded information which has been coded in accordance with the *DVD 1.0 Specification for Read-Only Disc* and disc 202 may contain up to seventeen gigabytes of information. The computer 206 includes a driver, not shown, for enabling the operating system in the computer 206 to control and exchange information with the drive 204. Computer 206 also includes one or more input devices 212 which receive input from a user.

The computer 206 also includes a control and playback program shown schematically in FIG. 2 as having a navigation object 208 with logic for reading data from the drive. A presentation engine 210 includes decompressing and decoding routines for decoding the information on the disc 202 and routines for formatting the information for display. For example, the audio information may be compressed by means of conventional compression technique known as Dolby® AC-3® compression, also known as "Dolby® Digital" decompression. Video information may be compressed using a compression technique known as Moving Picture Experts Group-2 (MPEG-s). The computer 206 also includes an optimizer 214 and a storage unit 216. The storage unit 216 operates as a cache and may take the form of system RAM 110. In an illustrative embodiment, the optimizer 214 operates upon navigation commands to reduce the amount of memory required to store the navigation commands from a disc 202 and to increase the execution speed of commands which form the command stream which directs playback of information stored on the disc 202.

The implementation of optimizer 214 will be described in greater detail with reference to FIGS. 3–6B.

In an illustrative embodiment, the software elements of system 200 are implemented using object-oriented programming techniques. As will be understood by those skilled in the art, Object-Oriented Programming (OOP) techniques involve the definition, creation, use and destruction of "objects". These objects are software entities comprising data elements, or attributes, and methods, or functions, which manipulate the data elements. The attributes and related methods are treated by the software as an entity and can be created, used and deleted as if they were a single item. Together, the attributes and methods enable objects to model virtually any real-world entity in terms of its characteristics, which can be represented by the data elements, and its behavior, which can be represented by its data manipulation functions. In this way, objects can model concrete things like people and computers, and they can also model abstract concepts like numbers or geometrical designs.

Objects are defined by creating "classes" which are not objects themselves, but which act as templates that instruct the compiler how to construct the actual object. A class may, for example, specify the number and type of data variables and the steps involved in the methods which manipulate the data. When an object-oriented program is compiled, the class code is compiled into the program, but no objects exist. Therefore, none of the variables or data structures in the compiled program exist or have any memory allotted to them. An object is actually created by the program at runtime by means of a special function called a constructor which uses the corresponding class definition and additional information, such as arguments provided during object creation, to construct the object. Likewise objects are destroyed by a special function called a destructor. Objects may be used by using their data and invoking their functions. When an object is created at runtime memory is allotted and data structures are created.

The principle benefits of object-oriented programming techniques arise out of three basic principles; encapsulation, polymorphism and inheritance. More specifically, objects can be designed to hide, or encapsulate, all, or a portion of, the internal data structure and the internal functions. More particularly, during program design, a program developer can define objects in which all or some of the attributes and all or some of the related functions are considered "private" or for use only by the object itself. Other data or functions can be declared "public" or available for use by other programs. Access to the private variables by other programs can be controlled by defining public functions for an object which access the object's private data. The public functions form a controlled and consistent interface between the private data and the "outside" world. Any attempt to write program code which directly accesses the private variables causes the compiler to generate an error during program compilation which error stops the compilation process and prevents the program from being run.

Polymorphism is a concept which allows objects and functions which have the same overall format, but which work with different data, to function differently in order to produce consistent results. For example, an addition function may be defined as variable A plus variable B (A+B) and this same format can be used whether the A and B are numbers, characters or dollars and cents. However, the actual program code which performs the addition may differ widely depending on the type of variables that comprise A and B. Polymorphism allows three separate function definitions to be written, one for each type of variable (numbers, characters and dollars). After the functions have been defined, a program can later refer to the addition function by its common format (A+B) and, at runtime, the program will determine which of the three functions is actually called by examining the variable types. Polymorphism allows similar functions which produce analogous results to be "grouped" in the program source code to produce a more logical and clear program flow.

The third principle which underlies object-oriented programming is inheritance, which allows program developers to easily reuse pre-existing programs and to avoid creating software from scratch. The principle of inheritance allows a software developer to declare classes (and the objects which are later created from them) as related. Specifically, classes may be designated as subclasses of other base classes. A subclass "inherits" and has access to all of the public functions of its base classes just as if these function appeared in the subclass. Alternatively, a subclass can override some or all of its inherited functions or may modify some or all of its inherited functions merely by defining a new function with the same form (overriding or modification does not alter the function in the base class, but merely modifies the use of the function in the subclass). The creation of a new subclass which has some of the functionality (with selective modification) of another class allows software developers to easily customize existing code to meet their particular needs.

Figure 3:
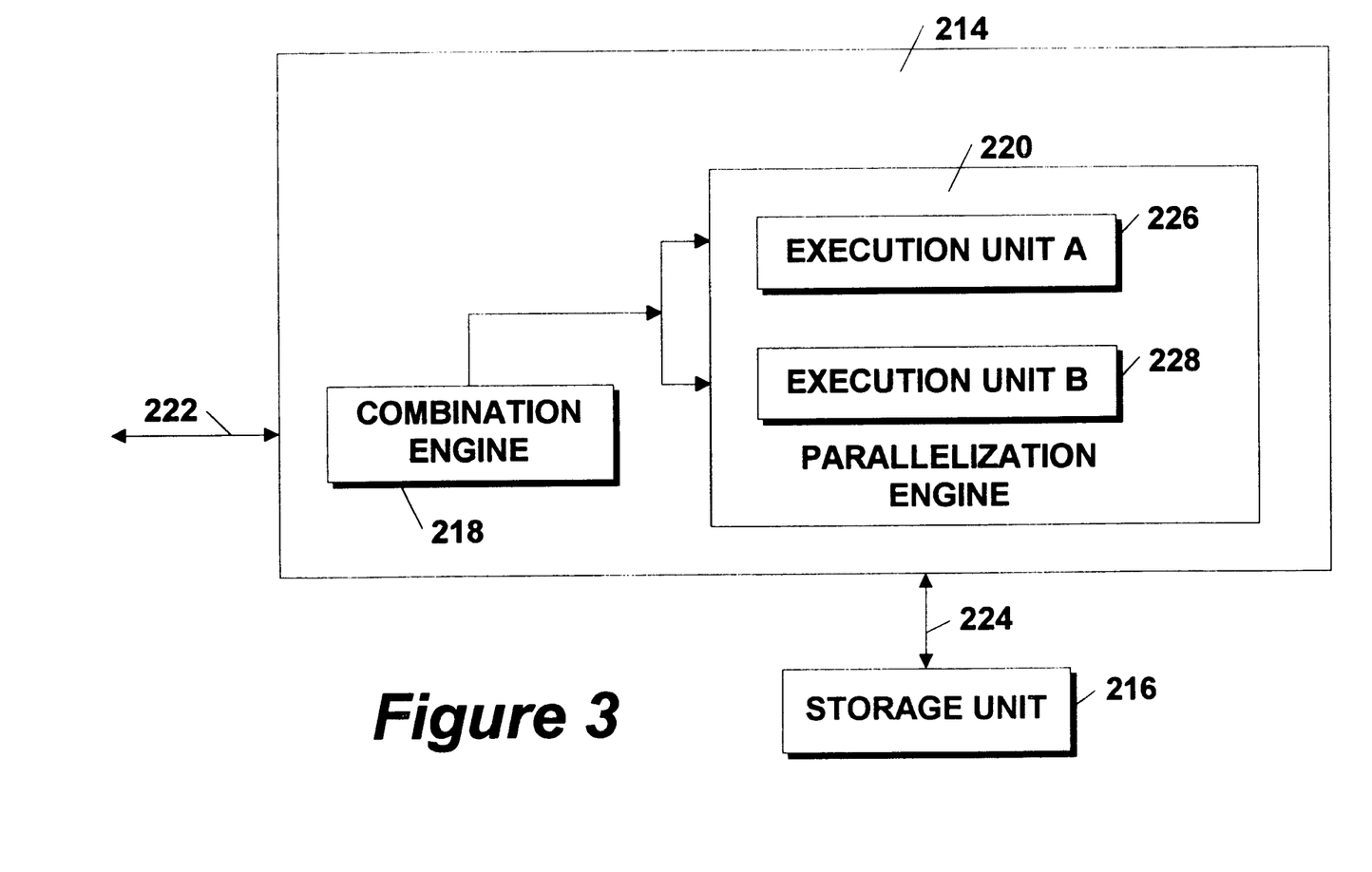
FIG. 3 is a block diagram illustrating the command optimizer and subcomponents and a storage unit.

The conceptual block diagram of FIG. 3 illustrates the major components of the Optimizer 214 in greater detail. The Optimizer 214 includes a combination unit 218 and a parallelization engine 220. As previously noted, a DVD playback system typically downloads navigational information from a disc 202 before the system begins to play the disc's multimedia content. That is, in a typical sequence of operation, the navigation engine 208 would read all the navigation data from a disc 202 via the drive 204. The presentation engine 210 would then decompress and decode the disc's multimedia data. In this illustrative embodiment, the optimizer is configured for receiving navigation commands, via connection 222 from the navigation engine 208, which reads them, using the drive 204. Each of combination engine 218 and parallelization engine 220, in the illustrative embodiment, may be implemented with one or more objects having the appropriate methods and attributes defined therein to perform the algorithms outlined in FIGS. 4–6B, as described hereinafter. In addition, such objects may execute in either a single-threaded or multi-threaded environment or, in a single processor or multiple processor environment, as explained hereinafter.

Optimizer 214 employs a combination engine 218 to combine commands whenever possible. Operation of the combination engine 218 will be discussed in greater detail with reference to FIG. 4. Briefly, the combination engine combines commands which the DVD specification allows the combination of, but which, for whatever reason, have not been combined when coded on the disc 202. By combining commands in this fashion, the optimizer 214 allows the playback system 200 to store more of the DVD disc's navigation commands in a relatively compact storage unit 216. Consequently, in a system 200 which possesses relatively limited storage capacity, the optimizer may allow a system 200 to store entire disc's navigation commands, even though it only has the capability to store a portion of the navigation commands without the combination operation. Thus, the combination engine may eliminate repeated accesses to the disc 202 and thereby accelerate the systems playback operation. After combination by the engine 218, the combined commands are typically stored in the storage unit 216 via connection 224.

In the illustrative embodiment, combination engine 218 may be implemented as a single object executing on a single thread. Such object may perform a method capable of performing the command analysis and combination as described in greater detail with regard to FIG. 4. In addition, such object may include data or attributes which represent the various commands and their parameters as defined within the DVD specification. In this manner, the object comprising optimization engine 214 performs a scanning operation to determine if a navigation command is of a type which can be combined with another command, and, secondly if a subsequent command may be combined with the current command, as described in greater detail hereinafter.

Figure 4:
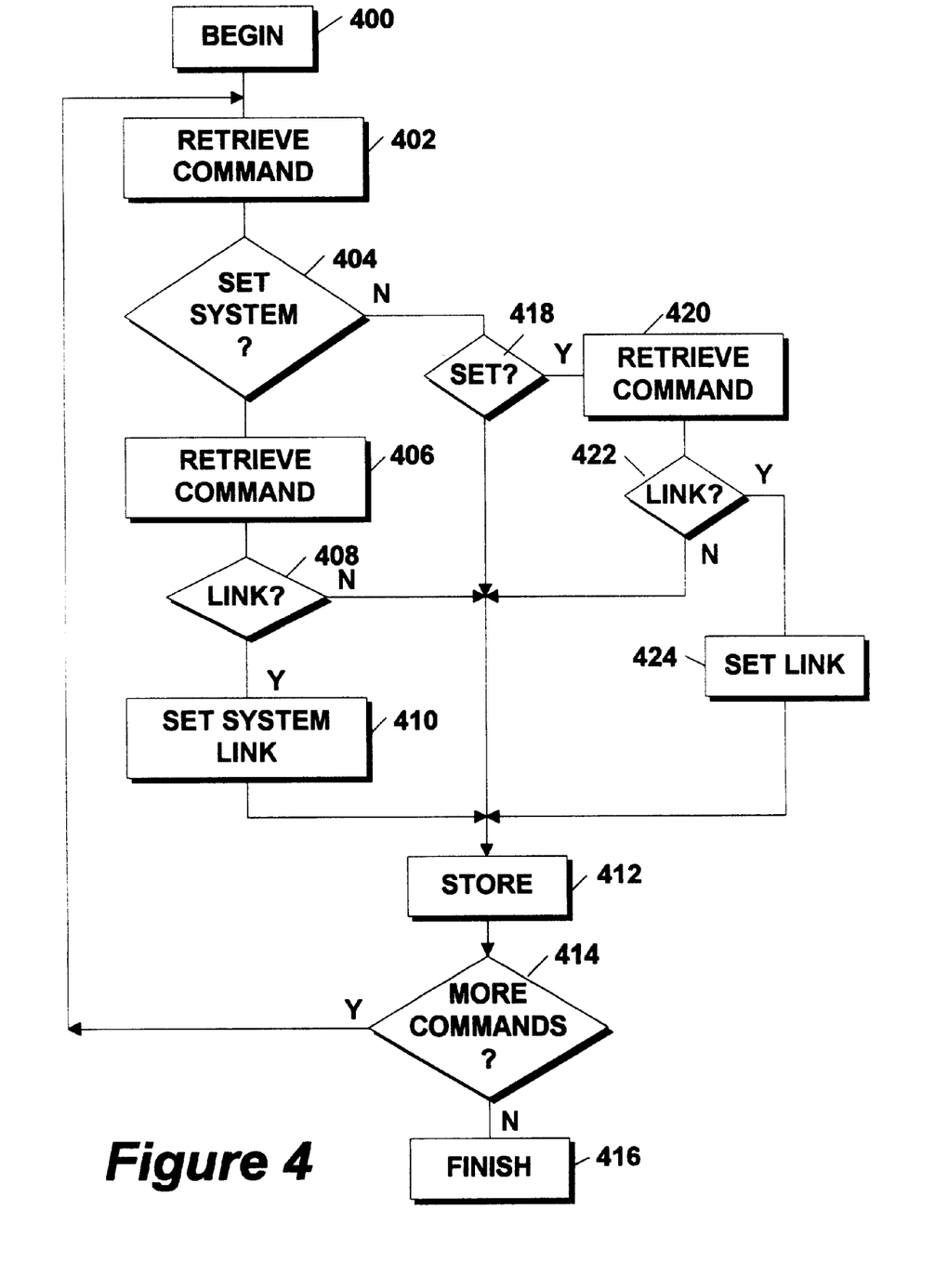
FIG. 4 is a flow chart which illustrates the process of compressing commands in accordance with the principles of the present invention.

Operation of the combination engine 218 is set forth in flow chart of FIG. 4. The process of combining commands which were, for example, coded as separate commands when the navigation commands were coded on the DVD disc 202, begins in step 400 and proceeds to step 402. In step 402, the combination engine 218 retrieves a command. In the illustrative embodiment, the combination engine retrieves the command from navigation engine 208 as the commands are read from the disc 202. From step 402, the process proceeds to step 404, where the combination engine determines whether the command just retrieved is a Set System command such as SetSTN, SetNVTMR, etc., which sets the internal system parameters of the player 200. If the command is a SetSystem command, the process proceeds to step 406 where the next command is retrieved and from there to step 408 where this "next" command is examined to determine whether it is a LINK command, such as, LINKPGCN, LINKPTTN, etc. If the command is a LINK command, the process proceeds to step 410 where the two commands are combined into one SetSystemLink command. From step 410, the process proceeds to step 412, where the combined command is stored, illustratively, in the storage unit 216.

From step 412, the process proceeds to step 414, where the combination engine determines whether there are more commands to process. If there are more commands to process, the process returns to step 402. Alternatively, if there are no more commands to process, the process proceeds to finish in step 416.

Returning to step 404, if the command is not a SetSystem command, the combination engine determines, in step 418, whether the command is a Set command. If the command is not a Set command, the process proceeds to step 412 where the command is stored and proceeds, as previously described from step 412.

If, in step 418, the combination engine determines that the command is a Set command, the process proceeds from step 418 to step 420, where the command following the command retrieved in step 402 is retrieved. It should be noted that, for the sake of simplicity, this description of the illustrative embodiment assumes in step 406 and in step 420 that more commands are available. If there are no more commands, the process would proceed to finish, as previously described. After retrieving the next command in step 420, the process proceeds to step 422, where the combination engine 218 determines whether this "next", command is a Link command. If the command is a Link command, the process proceeds to step 424, where combination engine 218 combines the Set and Link commands into one SetLink command, and, from step 422 to step 412 where, as previously described, the combined command is stored. If, in either step 408 or step 422, the combination engine 218 determines that the "next" command is not a Link command, the process proceeds to step 412 where the command retrieved in step 402 is stored, and the process returns to step 402. Upon returning to step 402, the retrieved command is the one retrieved in step 406 or step 420.

In addition to the combination engine 218, the optimizer may include a parallelization engine 220 which, as will be explained in greater detail with reference to FIGS. 5 and 6, organizes navigation commands for parallel execution command combinations which are susceptible to parallel execution are sent to execution unit A 226 and execution unit B 228, where the commands are executed and a command stream is assembled from the executed commands. The command stream is sent via a connection 222 to the presentation engine 210. The command stream produced by parallelization engine 220 may be sent directly to the presentation engine 210 via connection 222 for immediate operation or the command stream may be stored temporarily.

In the illustrative embodiment, parallelization engine 220 comprises execution unit A 226 and unit B 228. Each execution unit may be implemented with a thread having the methods and attributes capable of executing the DVD navigational instructions as set forth in the DVD specification, and as previously described herein. Each such object functioning as an execution unit may execute on its own thread. Such threads may operate in synchronization with each other through use of a mutually exclusive (MUTEX) semaphor. Both execution units may be implemented on a platform having two processors, one for each execution unit object and its accompanying thread, or on a single processor in a time-sliced manner. Parallelization engine 220 may further comprise a third object and thread of execution which contains the appropriate methods and attributes for supplying commands to each of execution units A and B, in a manner described with reference to FIGS. 5–6B.

Figure 5:
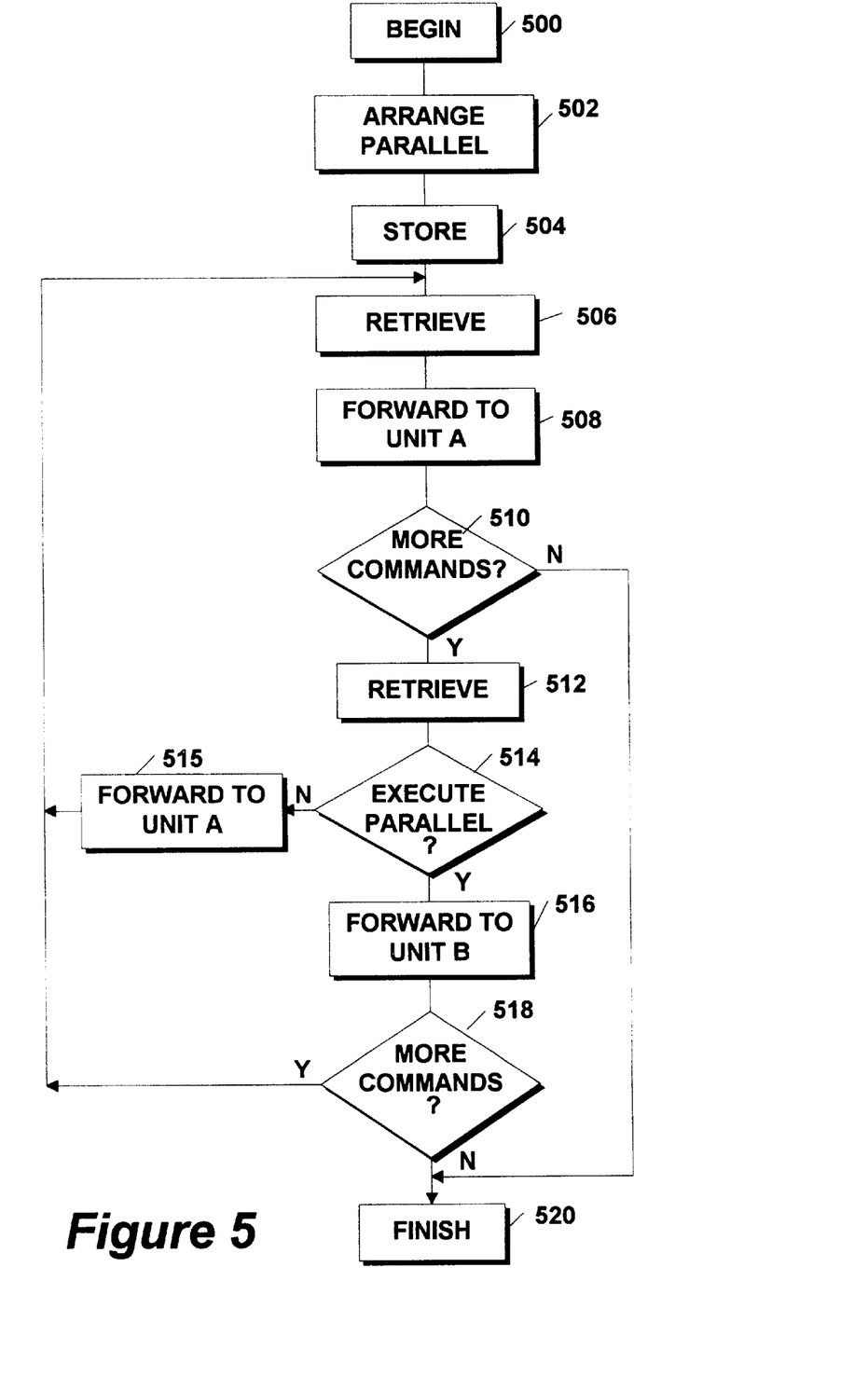
FIG. 5 is a flow chart which illustrates that overall operation of arranging and executing DVD commands in parallel in accordance with the principles of the present invention.
Figure 6A:
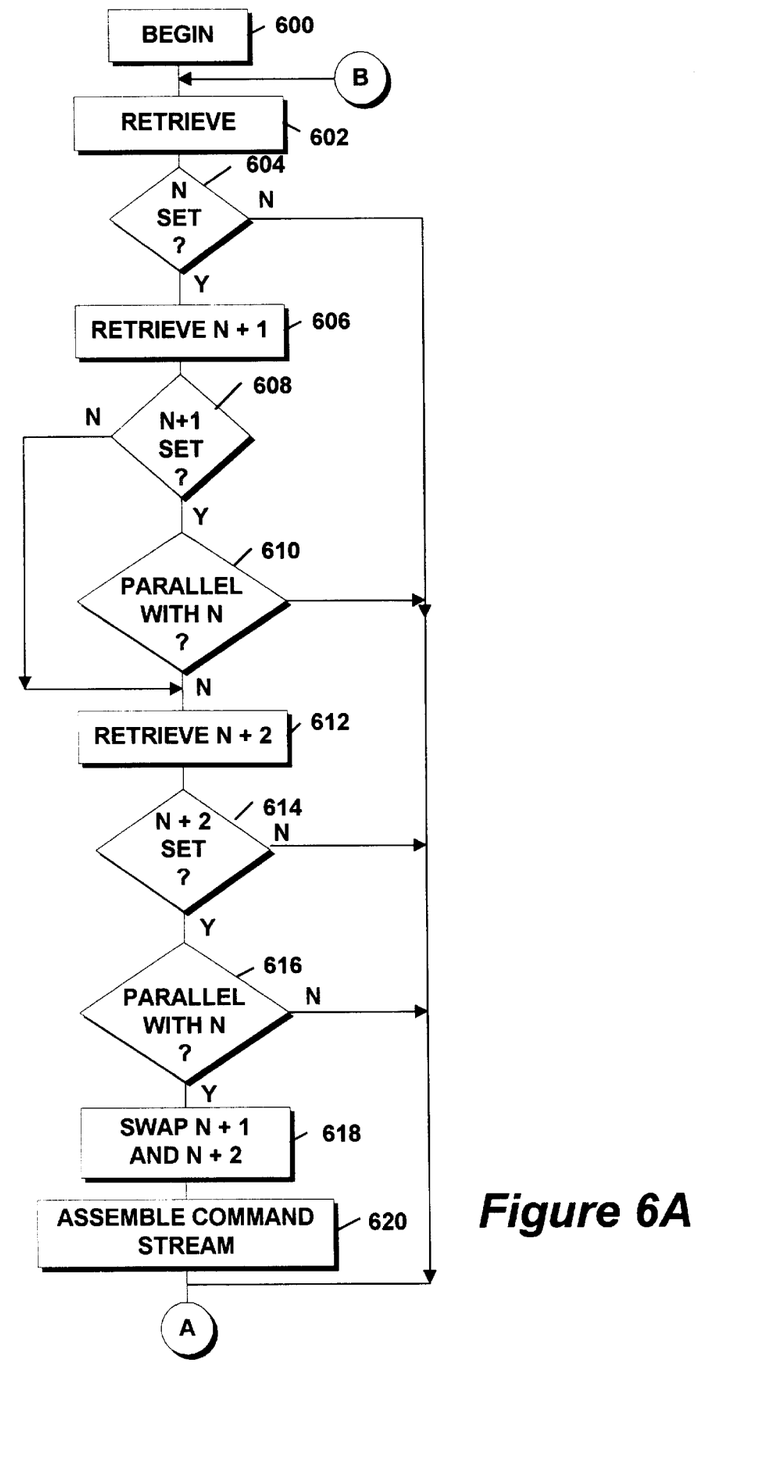
FIGS. 6A and 6B together form a flow chart that illustrates the arrangement of commands for parallel execution.

Turning now to the flow chart of FIG. 5, the process of accelerating the DVD player operation by parallel execution of navigation commands is described. The process begins in step 500 and proceeds to step 502 where the parallelization engine 220 arranges commands in parallel, where possible. This parallelization process is set forth in greater detail in the discussion related to FIGS. 6A and 6B. After commands are arranged in parallel, the process moves to step 504, where, in the illustrative embodiment, the rearranged commands are stored for buffering.

From step 504, the process proceeds to step 506, where a "rearranged" command i.e., one which has been arranged for parallel operation is retrieved. From step 506, the process proceeds to step 508, where the command retrieved in step 506 is forwarded to execution unit A 226 for execution. From step 508, the process proceeds to step 510, where the parallelization unit 220 determines whether there are more commands to execute and, if there are, the process proceeds to step 512, where the next of the "rearranged" commands is retrieved. From step 512, the process proceeds to step 514, where the parallelization engine 220 determines whether the command retrieved in step 506 will operate in parallel with the command retrieved in step 512. This determination is based upon whether the commands retrieved in steps 512 and 506 are Set commands and whether the operation in the second Set command are not affected by the Set command of step 506. If the commands will execute in parallel, the process proceeds to step 516, where the second Set command is forwarded to execution unit B 228. From step 516, the process proceeds to step 518, where it's determined whether there are more commands to process and, if there are, the process proceeds to step 506, and from there, as previously described. If there are no more commands to process, the process proceeds from step 518 to finish in step 520, as it would if it were determined in step 510, that there are no more commands.

If it is determined in step 514 that the command retrieved in step 512 cannot execute in parallel with the command retrieved in step 506, the process proceeds from step 514 to step 515, where the command is forwarded to the execution unit A 226 and from step 515, the process returns to step 506. As the commands are executed in this manner, the parallelization engine 220 assembles a command stream which is forwarded to the presentation engine 210.

Figure 6B:
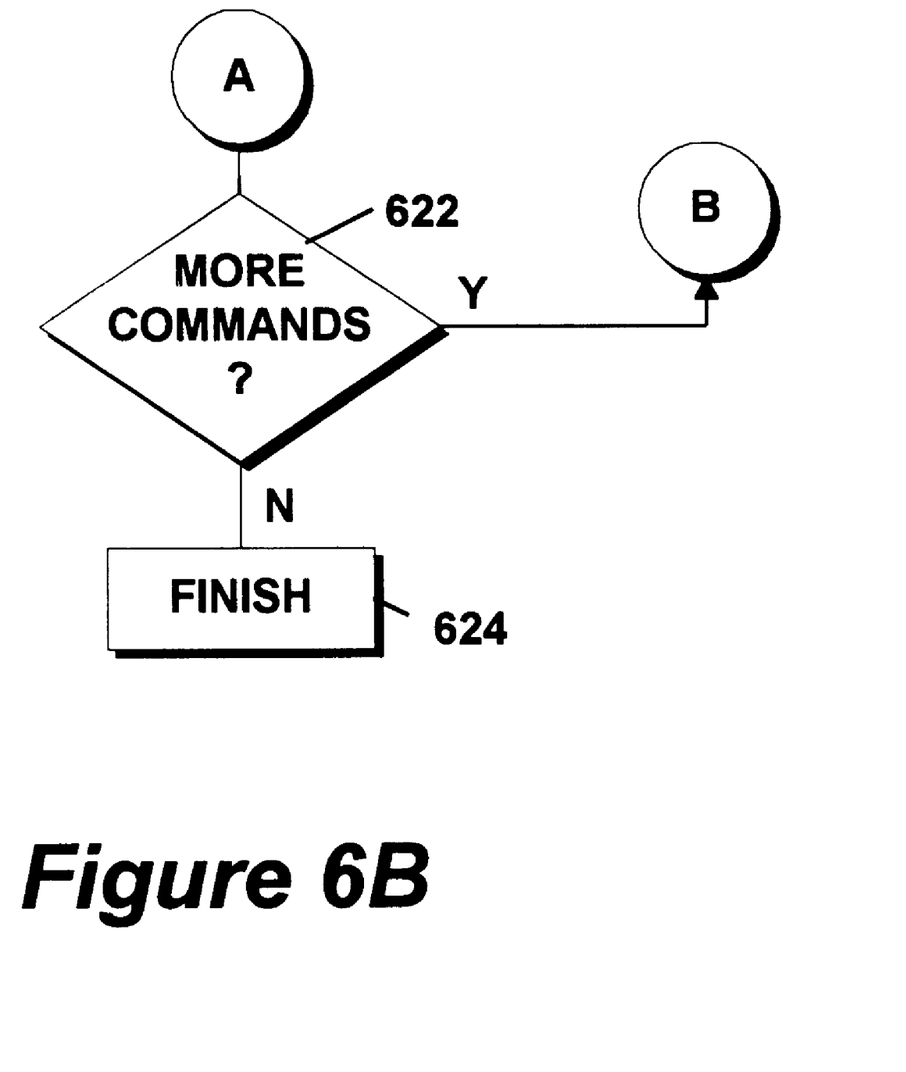

The process of arranging commands in parallel of step 502 is set forth in greater detail in flow charts of FIGS. 6A and 6B. The process begins in step 600 and proceeds from there to step 602 where the parallelization engine 220 retrieves a command. Referred to as command N, for explanatory purposes. From step 602, the process proceeds to step 604 where it is determined whether the command N is a Set command. If command N is a set command, the process proceeds to step 606 where the next command, command N+1, is retrieved from the storage unit 216. From step 606, the process proceeds to step 608, where it is determined whether command N+1 is a Set command. If command N+1 is a Set command, the process proceeds to step 610 where it is determined whether the command N+1 may operate in parallel with command N, i.e., whether the operands Set command, N+1 are not affected by the operation of Set command N.

If, in step 610, it is determined that, although command N+1 is a Set command, it can nevertheless not execute in parallel with command N, the process proceeds to step 612, as it would if, in step 608, it was determined the command N+1 is not a Set command. In step 612, the command following command N+1, i.e., command N+2, is retrieved from the storage unit 216. The process proceeds from 612 to step 614, where it is determined whether command N+2 is a Set command. If command N+2 is a Set command, the process proceeds from step 614 to step 616 where it is determined whether command N+2 can operate in parallel with command N. If command N+2 can operate in parallel with command N, the process proceeds to step 618, where the order of commands N+1 and N+2 are swapped, so that command N+2 now immediately follows command N. After swapping commands in step 618, the process proceeds to step 620 where commands which may be sent for execution to execution units A and/or B are assembled.

In step 620, the process proceeds to step 622 where the parallelization engine 220 determines whether there are more commands to be processed, and, if there are none, the process proceeds to finish in step 624. Alternatively, if there are more commands to process, the process proceeds through off page connector B to step 602 where a command N is retrieved. Noted that command N may be the next sequential command following the command N of the previous pass through the loop, or it may be N+1, N+2, or N+3 of the previous pass through the loop, depending upon the outcome of the previous loop's operation. For example, if it is determined in step 604 that command N is not a Set command, the process proceeds to step 622A, and, if there are more commands, the command retrieved in step 602 will be command N+1. If it is determined in step 610 that the command N+1 cannot operate in parallel with command N, the command retrieved in step 602 in the next pass through the loop will be command N+1. If it is determined in step 614, that the command N+2 is not a Set command, command N+3 will be used as command N in step 602 in the next pass through the loop. Finally, if, in step 616, it is determined that command N+2, although Set command cannot operate in parallel with command N, command N+1 will be command N of step 602 in the next pass through the loop.

A software implementation of the above described embodiment(s) may comprise a series of computer instructions either fixed on a tangible medium, such as a computer readable media, e.g. diskette 142, CD-ROM 147, ROM 115, or fixed disc 152 of FIG. 1, or transmittable to a computer system, via a modem or other interface device, such as communications adapter 190 connected to the network 195 over a medium 191. Medium 191 can be either a tangible medium, including but not limited to optical or analog communications lines, or may be implemented with wireless techniques, including but not limited to microwave, infrared or other transmission techniques. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, preloaded with a computer system, e.g., on system ROM or fixed disc, or distributed from a server or electronic bulletin board over a network, e.g., the Internet or World Wide Web.

The reader will appreciate that the present invention contemplates a method, apparatus and computer program product which enables optimizing efficiency with which commands are executed from the medium. This efficiency is achieved to compression of the command stream through combination of commands, as well as through parallel execution command, where applicable.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. Further, the methods of the invention may be achieved in either all software implementations, using the appropriate object or processor instructions, or in hybrid implementations which utilize a combination of hardware logic, software logic and/or firmware to achieve the same results, the specific configuration of logic and/or instructions utilized to achieve a particular function, as well as other modifications to the inventive concept are intended to be covered by the appended claims.

What is claimed is:

1. In a playback system for use with a medium having stored thereon streamable playback data and navigation commands useful for navigation through a playback data stream, an apparatus for processing the navigation commands from the medium comprising:
   a navigation engine configured for retrieving navigation commands from the medium prior to playback of the data stream;
   an optimizer coupled to the navigation engine, for combining navigation commands retrieved from the medium by the navigation engine, and;
   a memory for storing the combined navigation commands prior to execution thereof.

2. Apparatus of claim 1 wherein the optimizer is configured for combining first and second sequential navigation commands if the optimizer determines that the first navigation command and the second navigation command are combinable.

3. Apparatus of claim 2 wherein said optimizer is configured for detecting a SetSystem command immediately followed by a Link command and for generating a combined SetSystemLink command therefrom.

4. Apparatus of claim 2 wherein the optimizer is configured for detecting a Set command followed by a Link command and for generating a combined Set Link command therefrom.

5. Apparatus of claim 1 wherein said optimizer is configured for arranging commands for parallel execution.

6. Apparatus of claim 5 wherein the optimizer is configured for arranging navigation commands for parallel execution by arranging first and second navigation commands in direct succession whenever the operands of the second navigation command are not affected by the operation of the first navigation command.

7. Apparatus of claim 6 further comprising:
   a plurality of execution units, and
   wherein the optimizer is configured for routing a Set command to a first execution unit, and for routing a second Set command to a second execution unit, if the results of the operands of the second Set command are not affected by operation of the first Set command.

8. A method of optimizing navigation commands stored on a medium, the medium having stored thereon streamable playback data and navigation commands useful for navigation through a playback data stream, comprising:
   (a) retrieving navigation commands from the medium;
   (b) searching for first and second navigation commands that may be combined;
   (c) generating a combined navigation command from the first and second navigation commands; and
   (d) storing the combined navigation command in a storage unit prior to execution thereof.

9. The method of claim 8 wherein the step (b) comprises:
   (b1) detecting a first navigation command capable of combination with a second, subsequent navigation command;
   (b2) determining whether the second subsequent navigation command is a type of command that is capable of combination with the first navigation command; and wherein step (c) comprises:
   (c1) generating a combined navigation command from the first and second navigation commands if the second navigation command is the type of command that is capable of combination with the first navigation command and the operands of the second navigation command would not be affected by the execution of the first navigation command.

10. The method of claim 9 wherein step (b1) comprises detecting a SetSystem command, step (b2) comprises determining whether the navigation command immediately following the SetSystem command is a Link command, and step (c1) comprises combining the two navigation commands into a combined SetSystemLink command whenever the operands of the Link command would not be affected by execution of the SetSystem command.

11. The method of claim 9 wherein step (b1) comprises detecting a Set command, step (b2) comprises determining whether the navigation command immediately following the Set command is a Link command, and step (c1) comprises combining the two navigation commands into a combined SetLink command whenever the operand of the Link command would not be affected by execution of the Set command.

12. The method of claim 9 further comprising:
(e) arranging navigation commands for parallel execution.

13. The method of claim 12 wherein step (e) comprises:
(e.1) arranging first and second Set commands in direct succession whenever the operands of the second Set command are not affected by the execution of the first Set command.

14. The method of claim 13 further comprising:
(f) routing a first Set command to a first execution unit for execution, and
(g) routing a second, sequential Set command to a second execution unit, if the results of the second sequential Set commands are not affected by execution of the first Set command.

15. A computer program product for use with a playback system and a medium having stored thereon streamable playback data and navigation commands useful for navigation through a playback data stream, the computer program product comprising a computer usable medium having computer readable code thereon for optimizing execution of navigation commands comprising:
navigation engine program code configured for retrieving commands from the medium, prior to playback of the data stream;
optimizer program code for combining navigation commands retrieved from a medium by the navigation engine, and;
program code for storing the combined commands in a memory, prior to execution thereof.

16. The computer program product of claim 15 wherein the optimizer program code for combining navigation commands determines that a first and second navigation commands may be combined and combines the first and second navigation commands into a combined command.

17. The computer program product of claim 15 wherein the optimizer program code for combining navigation commands arranges navigation commands for parallel execution.

18. The computer program product of claim 17 wherein the optimizer program code for combining navigation commands arranges navigation commands for parallel execution by arranging first and second navigation commands of similar type in direct succession whenever the operands of the of the second navigation command are not affected by the execution of the first navigation command.

19. The computer program product of claim 18 further comprising:
program code for routing the first navigation command to a first execution unit, and for routing the second sequential navigation command to a second execution unit, if the operands of the second sequential navigation command are not affected by operation of the first navigation command.

20. The computer program product of claim 15 further comprising:
program code for storing combined navigation commands in a memory.

* * * * *